Sept. 22, 1925.  
E. NUBSON  
BUSHING REMOVER  
Filed Dec. 29, 1923  
1,554,688  
2 Sheets-Sheet 1

INVENTOR.  
EDWARD NUBSON.  
BY HIS ATTORNEY.

Sept. 22, 1925.

E. NUBSON 1,554,688

BUSHING REMOVER

Filed Dec. 29, 1923  2 Sheets-Sheet 2

INVENTOR.
EDWARD NUBSON.
BY HIS ATTORNEY.
James F. Williamson

Patented Sept. 22, 1925.

1,554,688

UNITED STATES PATENT OFFICE.

EDWARD NUBSON, OF MINNEAPOLIS, MINNESOTA.

BUSHING REMOVER.

Application filed December 29, 1923. Serial No. 683,470.

*To all whom it may concern:*

Be it known that I, EDWARD NUBSON, a citizen of the United States, residing at Minneapolis, in the county of Hennepin and State of Minnesota, have invented certain new and useful Improvements in Bushing Removers; and I do hereby declare the following to be a full, clear, and exact description of the invention, such as will enable others skilled in the art to which it appertains to make and use the same.

This invention relates to a device adapted to remove and replace bushings, and particularly, to such a device especially designed for removing and replacing the transmission shaft bushing in the universal joint housing of a Ford or similar automobile. The device of the invention is also constructed and arranged to pull a a gear from the said transmission or other shaft, and the device is further arranged to carry a reaming means for said bushing. The said bushing in the universal joint housing is difficult to reach and remove and such operations have heretofore been troublesome and inconvenient.

It is an object of the invention to provide a device for so removing and replacing said bushing, which device is adapted to carry a reamer for reaming the bore or the end of the bushing.

It is a further object of the invention to provide such a device comprising a yoke adapted to be positioned in the universal joint housing and to engage the same so as to straddle the bushing, one form of such yoke having swingable arms which can be used to pull the gear from the transmission shaft.

These and other objects and advantages of the invention will be fully set forth in the following description made in connection with the accompanying drawings in which like reference characters refer to the same parts throughout the different views, and in which, Fig. 1 is a view in side elevation of the device, certain parts thereof being broken away and others shown in vertical section, the universal joint housing being shown in vertical section and the bushing therein also being shown, the device being illustrated in the operation of removing a bushing;

Figure 1:
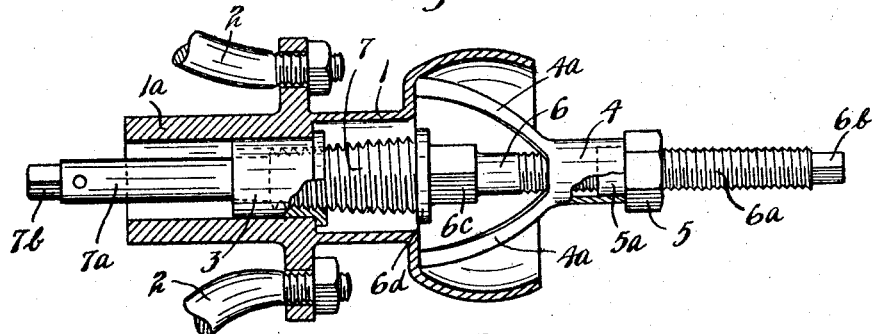

Referring to the drawings, the universal joint housing of a Ford or similar automobile is shown as 1, which housing is supported from the members 2 and has a hub 1ª in which the transmission shaft bushing 3 is seated. The bushing 3 is usually driven in place and held very firmly in position. The device of the invention comprises the yoke member 4 having a hub which is centrally bored and centrally disposed thereon. Legs 4ª diverge from one end of the hub and are adapted to be received in the housing 1 and engage with the interior thereof in position to straddle the opening therethrough. A nut 5 has a sleeve 5ª projecting from one end thereof adapted to fit in the bore of hub 4 so as to rotate therein. A member 6 is provided having a shank in one end threaded, as shown at 6ª, the end 6ᵇ of which is square or of angular shape in cross section. At one end of said shank is a portion 6ᶜ of square or angular cross section extending to a collar 6ᵈ. A bushing gripping member 7 extends from the collar 6ᵈ and preferably is integral with member 6 and comprises a tapered portion having sharp threads formed thereon. A shank 7ª extends from the end of the portion 7 for some distance, said shank being shown as cylindrical and of considerably less diameter than the smaller end of member 7 and the same is also provided with a square or angular shaped end 7ᵇ.

Figure 2:
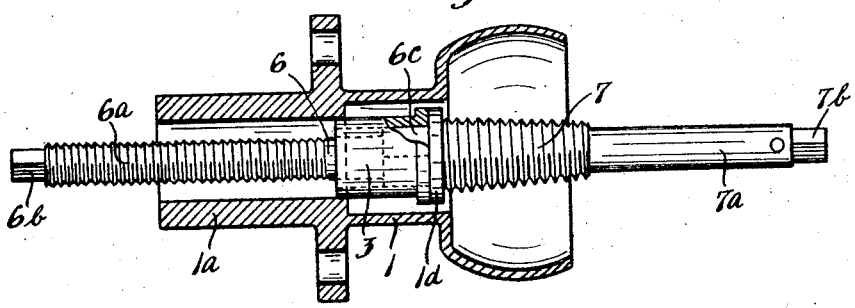
Fig. 2 is a view similar to Fig. 1 showing the device in position for placing a bushing in said housing.
Figure 3:
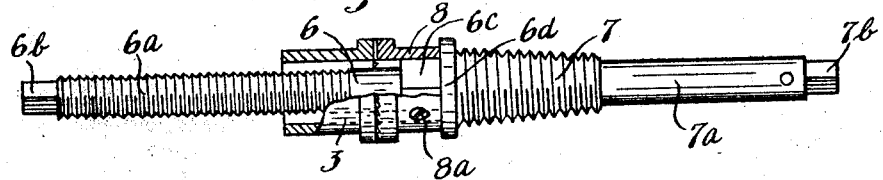
Fig. 3 is a view in side elevation of the device showing a bushing and reamer partly in elevation and partly in vertical section, the reamer being in position to face the end of the bushing.
Figure 4:
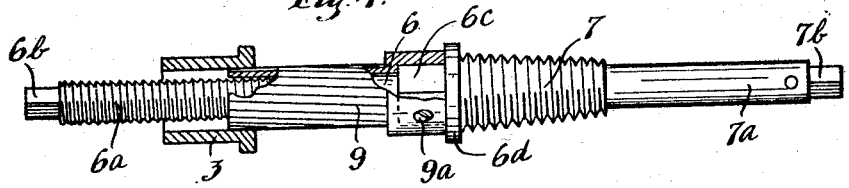
Fig. 4 is a view in side elevation of the device showing a reamer in place thereon in position to ream the interior of the bushing, which latter is shown in vertical section.

When the device is to be used to remove the bushing 3 the same will be disposed in the position illustrated in Fig. 1. The small end of member 7 will be inserted in the outer end of bushing 3 and said member will be turned by the application of a wrench to the end 6ᵇ. The gripping portion 7 will be firmly seated in the bushing 3 as the latter is of softer metal than the member 7 so that the sharp threads of the member 7 will cut into the bushing and secure a firm hold thereon. The nut 5 is now turned by the application of a suitable wrench and the member 6 will be drawn outwardly, the nut 5 acting against the member 4 as a base of re-action and rotating therein so that the threaded portion 6ª moves the member 6. Said member 6 will be drawn outwardly without rotation and the bushing 3 will be drawn from the housing by the portion 7. The bushing is thus easily and quickly removed in a very short time. When it is desired to insert a new bushing in the housing, the same will be placed in the position shown in Fig. 2. The threaded shank 6ª will now be placed through the bushing so that collar 6ᵈ abuts against the outer end of the bushing. The bushing can now be driven into place by driving upon the outer end of the shank 7ª. The bushing can thus be very quickly replaced. After the bushing is seated it is desirable to ream the bore thereof and to ream or face the outer face of the bushing flange. For this purpose, a hand reamer 8 having a square angular aperture therein is placed upon the portion 6ᵇ of the member 6. If desired, a hand reamer may be used having a cylindrical bore into which the squared portion 6ᶜ fits, the reamer being held from rotation on said portion by a set screw 8ª. The end of bushing 3 can now be faced by turning shank 7ª by a wrench applied to the end 7ᵇ thereof.

To ream the bore of the bushing 3, the reamer 9 is used having an apertured head portion 9ª fitting over the portion 6ᶜ in the same manner as described for the reamer 8. The reamer 9 can then be advanced through the bushing 3 by turning the shank 7ª by its end 7ᵇ and pressing thereon.

The worn or damaged bushing is thus removed from the housing and a new bushing inserted and completely finished in a very short time. The whole operation is quickly performed and a great deal of labor necessary in prior methods is eliminated and a great deal of time saved.

Figure 5:
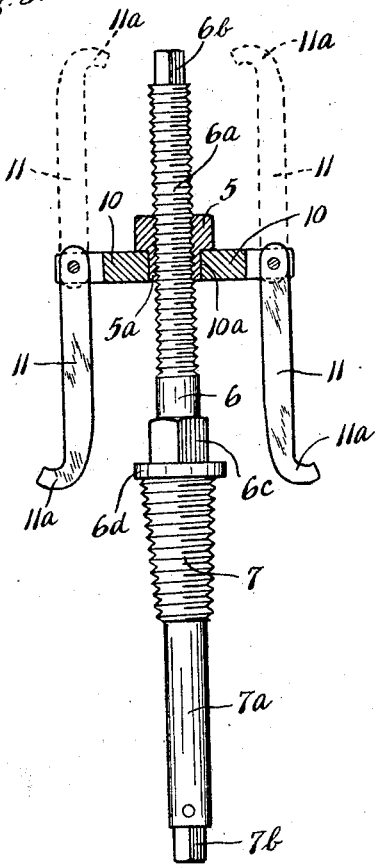
Fig. 5 is a view in side elevation of the device showing a modified form of yoke used therewith.

In Fig. 5, a modified form of yoke is shown which can be placed on the device and used in place of the yoke 4. The said yoke comprises a central portion 10 having a central bore 10ª in which the nut 5 fits. The member 10 has slotted or bifurcated portions at each end in which are pivoted arms 11 having curved or hook-shaped ends 11ª.

When the yoke shown in Fig. 5 is used to remove the bushing the arms 11 are swung into the position shown in full lines and will then be disposed in and engage the inner side of the housing 1 just as do the legs 4ª shown in Fig. 1. The arms 11 can be swung to the dotted line position and their hooked ends 11ª can then be engaged over the gear on the end of the transmission shaft, the end 6ᵇ of the member 6 engaging the end of the shaft. If the nut 5 now be turned, the member 10 and arms 11 will be moved longitudinally of the member 6, the shaft forming a base of re-action so that the gear can be pulled from said shaft.

From the above description it is seen that applicant has provided a simple and efficient device for the purpose intended. The various operations performed on the bushing and shaft are completed by the use of one single member comprising the parts 5, 6 and the yoke 4 or 10. The device 6 is easily and inexpensively made from one bar and is quite strong and durable.

It will, of course, be understood that various changes may be made in the form, details and proportions of the device without departing from the scope of applicant's invention which, generally stated, consists in a device capable of carrying out the objects above stated, such as shown and described and set forth in the appended claims.

What is claimed is:

1. A device for operating on the universal housing bushing of a Ford or similar automobile comprising means adapted to be positioned in said housing for engaging the same and straddling said bushing, a member extending through said means having angularly shaped ends, a bushing gripping means carried by said member intermediate said ends, means adjacent said bushing gripping means for engaging the end of said bushing, means at one end of said member adapted to contact said first mentioned means to move said member longitudinally relatively thereof, said housing acting as a base of reaction, and an angularly shaped means adjacent the means for engaging the end of said bushing adapted to fit in a reamer whereby said bushing can be reamed by turning said member.

2. A device for removing and replacing the universal housing bushing of a Ford or similar automobile comprising a yoke member having legs adapted to be positioned in and engage the said housing at each side of the bushing, a nut member journaled in and resting upon said yoke, a member having a threaded shank fitting in said nut, which shank has an angularly shaped end, a collar on said shank, a bushing gripping means adjacent said collar, and a shank extending from said gripping means also having an angularly shaped end.

3. A device for removing and replacing the universal housing bushing of an automobile comprising a yoke member having double ended legs one set of which ends are adapted to be positioned in and engage the said housing at each side of said bushing, a member movable partially through said yoke having a portion adapted to engage a bushing to move the same longitudinally, means engaging said yoke relatively to move said member and yoke, the legs of said yoke being swingable and the other set of ends thereof being adapted to engage a gear whereby one end of said member may engage a shaft carrying said gear and said shaft and gear relatively moved.

4. A device for removing and replacing the universal bushing of a Ford or similar automobile comprising a yoke member having legs adapted to be positioned in and engaged by said housing at each side of said bushing, a nut member resting upon said yoke, a member having a threaded shank fitting in said nut, said shank having an angularly shaped end, a collar on said shank having a flat side, a tapered threaded bushing gripping means adjacent said collar, and a threaded shank extending from said gripping means also having an angularly shaped end.

5. A device for removing and replacing the universal bushing of a Ford or similar automobile, comprising a yoke member having spaced legs adapted to be positioned in and engaged by said housing at each side of said bushing, said yoke having a bored head, a nut member resting on said head and having a portion journaled therein, a member having at one end a threaded shank extending through and fitting in said nut, said shank having an angularly shaped end, a tapered threaded bushing gripping means carried by said member at the other end of said shank, and a shank extending from the other end of said gripping means having an angularly shaped end.

6. The structure set forth in claim 5, said member being formed to carry a reamer for reaming the end of said bushing.

7. A device for removing and replacing bushings comprising a yoke member having a head, and legs diverging therefrom, said legs being adapted to be positioned at each side of said bushing, a nut member adapted to engage the said head of said yoke and having a threaded bore, a member having at one end a threaded shank extending through said nut and engaging the threaded bore thereof, said shank having its free end of angular shape and having a tapered threaded bushing gripping means at its other end, and a squared shank projecting from said bushing gripping means.

In testimony whereof I affix my signature.

EDWARD NUBSON.